(12) United States Patent
Krejci et al.

(10) Patent No.: US 12,038,741 B2
(45) Date of Patent: Jul. 16, 2024

(54) SYSTEMS AND METHODS FOR AUTHENTICATING INDUSTRIAL AUTOMATION COMPONENTS

(71) Applicant: Rockwell Automation Technologies, Inc., Mayfield Heights, OH (US)

(72) Inventors: Neal R. Krejci, Seven Hills, OH (US); Chandresh R. Chaudhari, Reminderville, OH (US); Sean P. Overberger, Painesville, OH (US); Bret S. Hildebran, Chagrin Falls, OH (US); Daniel E. Killian, Eastlake, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 375 days.

(21) Appl. No.: 17/485,779

(22) Filed: Sep. 27, 2021

(65) Prior Publication Data

US 2023/0095486 A1   Mar. 30, 2023

(51) Int. Cl.
*G06F 21/00* (2013.01)
*G05B 19/418* (2006.01)
*G06F 13/40* (2006.01)

(52) U.S. Cl.
CPC ..... *G05B 19/4185* (2013.01); *G06F 13/4022* (2013.01); *G06F 13/409* (2013.01); *G05B 2219/23345* (2013.01); *G05B 2219/24127* (2013.01); *G05B 2219/25205* (2013.01);
(Continued)

(58) Field of Classification Search
CPC ...... G06F 3/065; G06F 3/0653; G06F 9/3887; G06F 2009/45579; G06F 16/2255; G06F 12/1408; G06F 13/4027; G06F 2212/1052; G06F 21/44; G06F 13/409; G06F 21/73; G06F 13/4022; G06F 21/57; G05B 2219/23345; G05B 2219/25296; G05B 19/4185; G05B 2219/25464;
(Continued)

(56) References Cited

U.S. PATENT DOCUMENTS 9,032,522 B1   5/2015   Mulder et al.
11,467,780 B1 * 10/2022   Perez Guevara ..... G06F 3/0653
(Continued)

FOREIGN PATENT DOCUMENTS

DE   10238093 A1       3/2004
EP    3518133 A1 *    7/2019   ........... G05B 19/048
(Continued)

OTHER PUBLICATIONS

NPL 2010-Backplane expander (Year: 2010).*
Extended European Search Report for Application No. 22198003.0 mailed Feb. 14, 2023, 7 pages.

*Primary Examiner* — Tri M Tran
(74) *Attorney, Agent, or Firm* — Fletcher Yoder, P.C.

(57) ABSTRACT

A first component of an industrial automation system includes an electrically erasable programmable read-only memory (EEPROM) storing data identifying the first component. The data identifying the first component is read from the EEPROM by a second component to which the first component is communicatively coupled to authenticate the first component. The first component lacks a processor and a microcontroller, and does not run firmware.

9 Claims, 7 Drawing Sheets

(52) U.S. Cl.
CPC .............. *G05B 2219/25296* (2013.01); *G05B 2219/25464* (2013.01)

(58) Field of Classification Search
CPC ........... G05B 2219/25205; G05B 2219/24127; G05B 19/0423
See application file for complete search history.

(56) References Cited

U.S. PATENT DOCUMENTS

2015/0039894 A1* 2/2015 Ho ........................ H04B 1/38
713/168
2020/0195450 A1* 6/2020 Bains ................. G06F 13/1668

FOREIGN PATENT DOCUMENTS

EP 3518133 A1 7/2019
WO 2015020633 A1 2/2015

* cited by examiner

SYSTEMS AND METHODS FOR AUTHENTICATING INDUSTRIAL AUTOMATION COMPONENTS

BACKGROUND

The present disclosure relates generally to authenticating industrial automation components. More specifically, the present disclosure relates to authenticating industrial automation components without firmware, microprocessors, or microcontrollers for use in input/output (I/O) systems.

Industrial automation systems may be used to provide automated control of one or more actuators. A controller may output a conditioned power signal to an actuator to control movement of the actuator. Input/output (I/O) systems may facilitate communication with controllers and other devices within an industrial automation system. In an effort to reduce costs, owners of industrial automation systems may procure components for use in their industrial automation systems from unauthorized sources. These components may include counterfeit components, stolen components, clones, refurbished components made from one or more decommissioned or previously used components, components that have been modified, either maliciously (e.g., malware), or in an effort to modify the components' capabilities, such that use of these components may pose unknown risks to industrial automation systems. For components running firmware and/or components with microcontrollers or microprocessors, authentication certificates may be used in conjunction with the firmware, microcontrollers, and/or microprocessors to perform authentication processes to authenticate components used within the industrial automation system. However, such authentication processes may not work for components that lack firmware, microcontrollers, and/or microprocessors. Accordingly, a way to authenticate components that lack firmware, microcontrollers, and/or microprocessors is needed.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one embodiment, input/output (I/O) system of an industrial automation system includes a rail, a first backplane switch coupled to the rail, a network adapter base coupled to the first backplane switch, a second backplane switch coupled to the rail and disposed adjacent to the first backplane switch, and an I/O bank. The network adapter base includes a first electrically erasable programmable read-only memory (EEPROM) storing first data identifying the network adapter base. The first backplane switch reads the first data from the first EEPROM to authenticate the network adapter base. The I/O bank includes an I/O base coupled to the second backplane switch, an I/O component coupled to the I/O base, and a terminal block coupled to the I/O base. The I/O base includes a second EEPROM storing second data identifying the I/O base. The second backplane switch reads the second data from the second EEPROM to authenticate the I/O base. The I/O component performs an industrial automation input/output function associated with a component of the industrial automation system. The terminal block is communicatively coupled to the component of the industrial automation system, wherein the terminal block includes a third EEPROM storing third data identifying the terminal block, wherein the I/O component reads the third data from the third EEPROM to authenticate the terminal block.

In another embodiment, a first component of an industrial automation system includes an electrically erasable programmable read-only memory (EEPROM) storing data identifying the first component. The data identifying the first component is read from the EEPROM by a second component to which the first component is communicatively coupled to authenticate the first component. The first component lacks a processor and a microcontroller, and does not run firmware.

In yet another embodiment, a method includes detecting that an industrial automation component has been connected to an input/output (I/O) system of an industrial automation system, wherein the industrial automation component comprises an electrically erasable programmable read-only memory (EEPROM) storing data identifying the component, wherein the component lacks a processor and a microcontroller, and wherein the component does not run firmware, reading the data from the EEPROM, and authenticating the industrial automation component.

DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The disclosed techniques include components of an input/output (I/O) system of an industrial automation system that lack firmware, microprocessors, and microcontrollers, but have electrically erasable programmable read-only memories (EEPROMs) that store identifying information. Such components may include, for example, network adapter bases, I/O bases, base expander components, terminal blocks, as well as other industrial automation components. When such components are connected to the I/O system, or upon being powered up, existing devices of the I/O system, such as backplane switches and/or I/O components may be configured to read the identifying information from the EEPROMs to authenticate the components. In some embodiments, the identifying information stored on the EEPROMS may be encrypted, in which case reading the identifying information from the EEPROMs may involve a cryptographic operation to decrypt the identifying information. Further, in some embodiments, the identifying information may be provided to a software application or a client device to verify the identity of the components. If the components are authenticated, they may be used as normal. However, if the components are not authenticated, a warning message/notification may be generated, and or aspects of the industrial automation system may be disabled. The identifying information may also be used to build models of the industrial automation system to suggest modifications to settings, provide installation and/or setup instructions, provide troubleshooting guidance, confirm configurations, etc. Further, the identifying information may be used for remote inventory and/or asset management.

Figure 1:
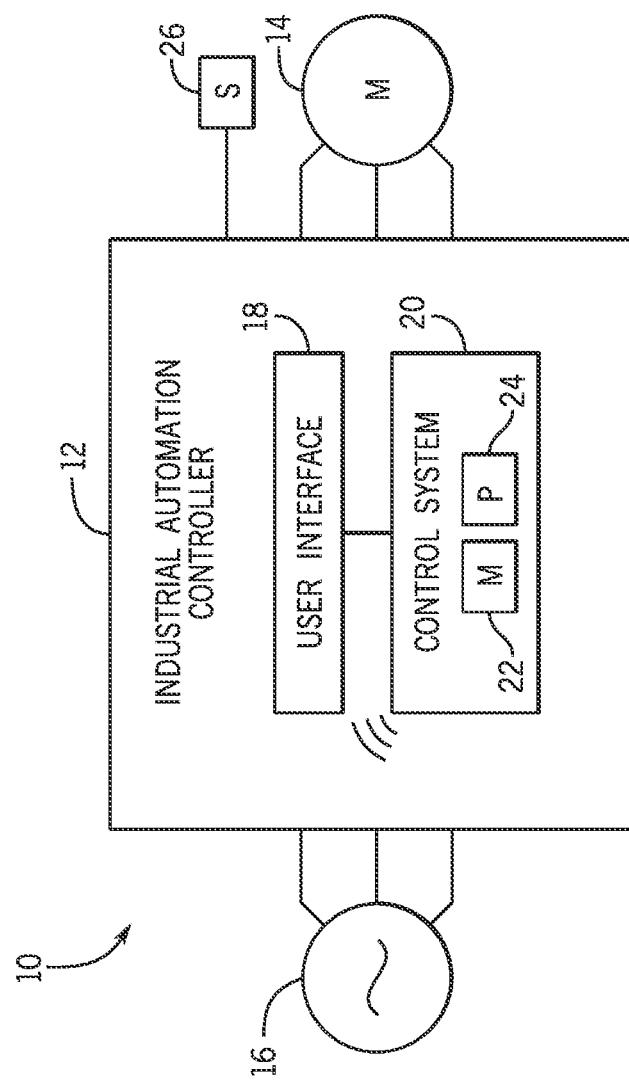
FIG. 1 is a schematic view of an industrial automation system, in accordance with embodiments presented herein.

By way of introduction, FIG. 1 is a schematic view of an industrial automation system 10. As shown, the industrial automation system 10 includes a controller 12 and an actuator 14 (e.g., a motor). The industrial automation system 10 may also include, or be coupled to, a power source 16. The power source 16 may include a generator, a battery (or other power storage device), or an external power grid. Though the controller 12 shown in FIG. 1 is a stand-alone controller 12, in more complex industrial automation systems 10, one or more controllers 12 may be grouped together with other components in a motor control center (MCC) to control multiple actuators. In the instant embodiment, the controller 12 includes a user interface 18, such as a human machine interface (HMI), and a control system 20, which may include a memory 22 and a processor 24.

The control system 20 may be programmed (e.g., via computer readable code or instructions stored on the memory 22 and configured to be executed by the processor 24) to provide signals for driving the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices (such as sensors 26). The programming of the control system 20 may be accomplished through software configuration or firmware code that may be loaded onto the internal memory 22 of the control system 20 or programmed via the user interface 18 of the controller 12. The control system 20 may respond to a defined set of operating parameters. The settings of the various operating parameters determine the operating characteristics of the controller 12. For example, various operating parameters may determine the speed or torque of the motor 14 or may determine how the controller 12 responds to the various external inputs (such as from sensors 26). As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) like control programming, and the like.

In some embodiments, the controller 12 may be communicatively coupled to one or more sensors 26 for detecting operating temperatures, voltages, currents, pressures, flow rates, etc. within the industrial automation system 10. With feedback data from the sensors 26, the control system 20 may keep detailed track of the various conditions under which the industrial automation system 10 may be operating. For example, the feedback data may include conditions such as actual motor speed, voltage, frequency, power quality, alarm conditions, etc.

Figure 2:
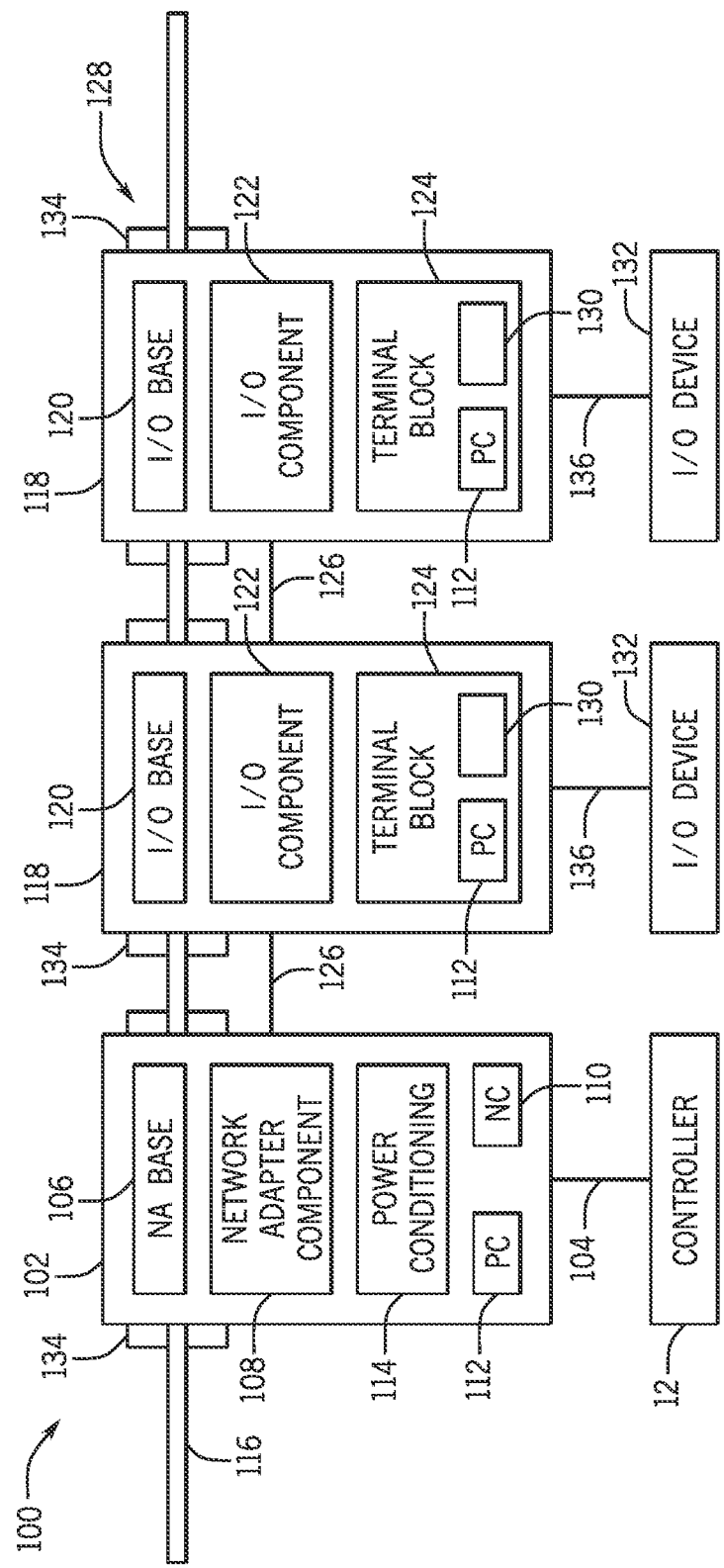
FIG. 2 is a schematic view of a modular input/output (I/O) system of the industrial automation system of FIG. 1, in accordance with embodiments presented herein.

FIG. 2, is a schematic view of a modular input/output (I/O) system 100 for the industrial automation system shown in FIG. 1. As illustrated, the modular I/O system 100 includes a network adapter 102 that is in communication with a controller 12 (e.g., a programmable logic controller or PLC) via a network 104 (e.g., an Ethernet/IP network or other industrial automation network) such that the network adapter 102 receives data from, transmits data to, and otherwise communicates with the controller 12. The network adapter 102 includes a network adapter base 106, a network adapter component 108 (e.g., a network adapter module), a network connector 110, and a power connector 112. In some embodiments, the network adapter 102 may also include power conditioning circuitry 114. The network adapter base 106 may be mounted (e.g., permanently or removably coupled) to a rail or plate 116. The network adapter component 108 may be removably coupled to the network adapter base 106 and include communication circuitry for communication with the controller 12 via the network connector 110 and the network 104 and/or communication with other I/O banks 118 coupled to the rail or panel 116. As such, the network adapter component 108 may be configured to manage communication within the I/O system (e.g., between the network adapter 102 and the various other I/O banks 118), and/or between the I/O system 100 and various other components of the industrial automation system including, for example, the controller 12. The power connector 112 may be configured to receive power from a power source (which may or may not be the same power source 16 shown in FIG. 1) that supplies power to the network adapter 102 and one or more other I/O banks 118 coupled to the rail or panel 116. In embodiments that have power conditioning circuitry 114, the power conditioning circuitry 114 may be configured to condition the power received from the power source 16 via the power connector 112 by amplifying the power signal, attenuating the power signal, stepping the power signal up or down, inverting the power signal, applying one or more filters to the power signal, converting a direct current (DC) power signal to alternating current (AC) power, converting an AC power signal to DC power, and so forth.

Each of the one or more other I/O banks 118 may include an I/O base 120, an I/O component 122 (e.g., an I/O module), and a terminal block 124 (e.g., removable terminal block or "RTB"). The I/O base 120 may also be mounted (e.g., permanently or removably coupled) to the rail or panel 116. The other I/O banks 118 may be sequentially communicatively coupled to one another and to the network adapter 102 via a multi-contact connector 126, forming a backplane 128, and enabling communication with the controller 12 and one or more other I/O devices 132 via the I/O wiring 136. The I/O components 122 may be removably coupled to the I/O base 120, thus enabling communication between the I/O components 122 and the controller 12 via the backplane 128. The I/O components 122 may be configured to perform one or more specialized industrial automation input/output functions such as DC input, DC output, AC input, AC output, analog input and/or output, resistance temperature detector (RTD) and/or thermocouple input, an output signal to control an actuator, and so forth. The terminal blocks 124 may include cage clamps, spring clamps, push-in terminals, screw terminals, or other wiring connectors 130 configured to couple to field wires associated with a field I/O device 132 (e.g., a sensor, flow meter, switch, probe, thermocouple, RTD, encoder, actuator, and so forth, associated with a process or machine being controlled by the controller 12. In some embodiments, the terminal block 124 may be a separate structure that is assembled and coupled to the I/O base 120. In other embodiments, the terminal block 124 may be integral to the I/O base 120. Different embodiments/configurations of terminal blocks 124 may be utilized, depending upon the particular configuration suited for the field device wiring connectors 130 (e.g., having different common terminals, ground connections, voltage supply terminals, etc.). The I/O banks 118 terminal block 124 may also include a power connector 112 to receive power from a power source (which may or may not be the same power source 16 shown in FIG. 1) that supplies power to the I/O bank 118 and/or the I/O devices 132 (e.g., sensors, actuators, etc.) that are communicatively coupled to the I/O bank 118. Each installed I/O component 122 communicates with the field device wiring connectors 130 of the same I/O base 120 to which the I/O component 122 is physically coupled. Input/output data are provided between the controller 12 and field devices 132 connected to the corresponding I/O base 120 via the backplane 128 and the network adapter component 108. In some embodiments, the network adapter 102 and I/O banks 118 may be coupled to the rail or panel 116 via respective backplane switches 134, sometimes called bus interface modules (BIMs), that facilitate electrical connections between the various components of the backplane switch 128 (e.g., the network adapter 102, the I/O banks 118, the rail 116, etc.). In some embodiments, the multi-contact connector 126 and the backplane switch 128 may be distinct components. In other embodiments, the functions of the multi-contact connector 126 and the backplane switch 128 may be performed by the same component.

As shown in FIG. 2, the backplane 128 is a circuit that sequentially couples the network adapter 102 and the adjacent I/O banks 118 in a series or a sequential manner through the connectors 126 of the backplane 128 and/or the backplane switch 134. For example, the backplane switches 134 of the adapter 102 and each I/O bank 118 use backplane data communication protocols to establish the above-described backplane circuit 128.

Figure 3:
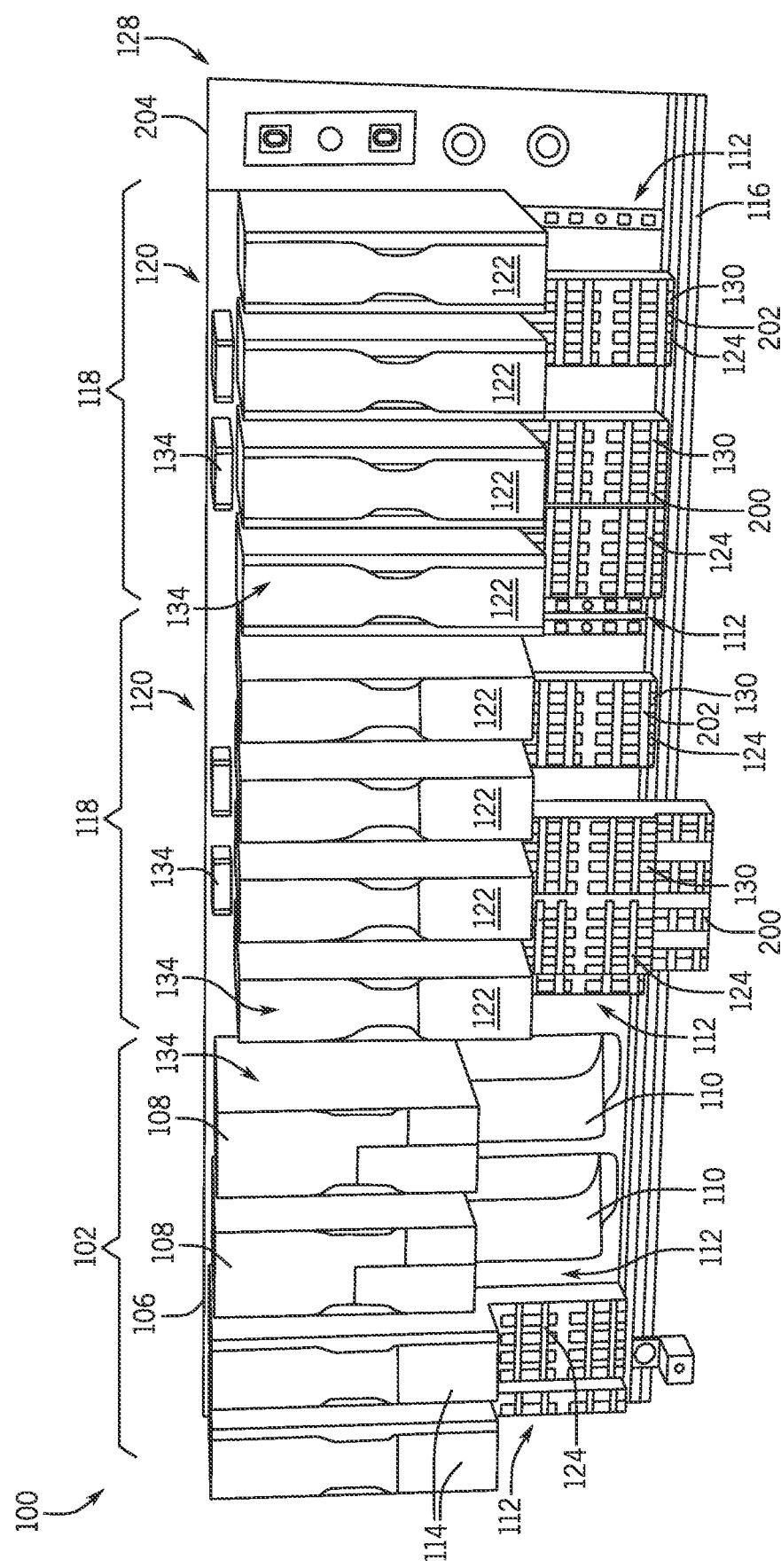
FIG. 3 is a perspective view of an embodiment of the I/O system of FIG. 2, in accordance with embodiments presented herein.

FIG. 3 is a perspective view of an embodiment of the I/O system 100 of FIG. 2. As with the embodiment shown in FIG. 2, the I/O system 100 includes a network adapter 102 and two I/O banks 118. The network adapter 102 includes a network adapter base 106 (e.g., a Rail Master Base), network adapter components 108, power conditioning components 114, power connectors 112 (e.g., removable terminal blocks), one or more network connectors 110, and backplane switches 134 (hidden). The I/O banks 118 include I/O bases 120 (e.g., Quad I/O Bases), I/O components 122, removable terminal blocks 124 with wiring connectors 130, and backplane switches 134. As shown, the removable terminal blocks 124 may be set up in a simplex configuration, in which a removable terminal block 124 supports a single I/O component 122, represented by element 200, or a duplex configuration in which a removable terminal block 124 supports two I/O components 122, represented by element 202.

As shown in FIG. 3, the I/O system 100 also includes a base expansion component 204 (e.g., a base expansion module or "BEM"), which couples to the rail or plate 116 and may be used to facilitate adding one or more additional I/O banks 118 to the I/O system 100. Accordingly, the base expansion component 204 may be configured with one or more connectors for communicatively coupling the one or more additional I/O banks 118 to the I/O banks 118 coupled to the rail or plate 116.

In an effort to reduce costs, owners of industrial automation systems may attempt to utilize components procured from unauthorized sources in their industrial automation systems. Such components may be counterfeit, stolen, clones, refurbished components made from one or more decommissioned or previously used components, components that have been modified, either maliciously (e.g., malware), or in an effort to increase or otherwise modify the components' capabilities. Such components may be available on the secondary market, from unauthorized distributors, on the grey market, and so forth. For components running firmware and/or components with microcontrollers or microprocessors, authentication certificates may be used in conjunction with the firmware, microcontrollers, and/or microprocessors to perform authentication processes to authenticate components used within the industrial automation system. However, such processes may not be feasible for authenticating components that lack firmware, microcontrollers, and/or microprocessors. The presently disclosed techniques include equipping industrial automation components that lack firmware, microcontrollers, and/or microprocessors with redundant secure memory devices, such as a secure or security capable electrically erasable programmable read-only memories (EEPROMs), storing identifying information that can be read and used to authenticate the industrial automation components. Though hereinafter the term EEPROM is used, it should be understood that anytime the term EEPROM is used, the associated component may be any secure memory device. For example, in the instant embodiment, network adapter bases 106, I/O bases 120, terminal blocks 124, and base expansion components 204 may each be equipped with a pair of single-wire or single-pin EEPROMs that store identifying information, read by the bus interface component or backplane switch 134 to authenticate the network adapter bases 106, I/O bases 120, terminal blocks 124, and/or base expansion components 204 upon start up, shut down, installation of the components, removal of the components, on command, etc. In some embodiments, an encrypted token or secret character string stored on the EEPROMs along with the identifying information and used to validate the identifying information stored on the EEPROMs.

Figure 4:
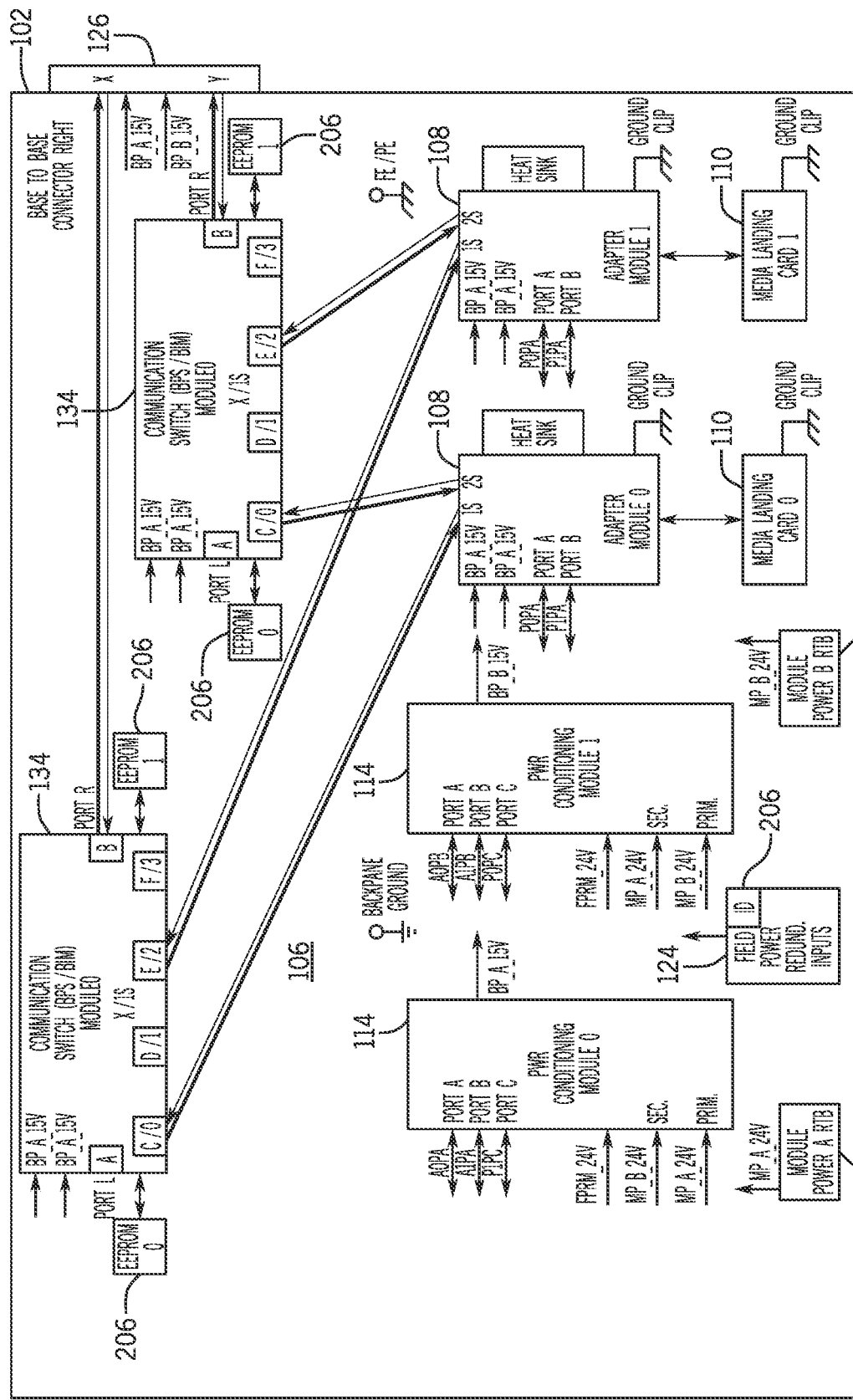
FIG. 4 is a schematic view of a network adapter utilizing a "Rail Master Base" network adapter base, in accordance with embodiments presented herein.

FIG. 4 is a schematic view of a network adapter 102 utilizing a "Rail Master Base" network adapter base 106. As shown, the network adapter base 106 includes a pair of redundant EEPROMs 206 (e.g., EEPROM 0 and EEPROM 1) that are communicatively coupled to the backplane switch 134. As previously described, the EEPROMs 206 may be single pin or single wire EEPROMs 206 such that all data stored on the EEPROMs 206 can be read by the backplane switch 134 via a single wire or pin, leaving other pins of the backplane switch 134 available for connecting to other components. For example, the EEPROMs 206 may store identification data including, for example, vendor ID, device type, product code, revision, serial number, product name, catalog number, manufacture date, warranty number, and so forth. In some embodiments, the data stored on the EEPROMs 206 may be encrypted, whereas in other embodiments, the data stored on the EEPROMs 206 may not be encrypted. Accordingly, when the network adapter base 106 outfitted with the pair of redundant EEPROMs 206 is installed on the rail or plate 116, the network adapter base 106 is communicatively coupled to the one or more backplane switches 134. Accordingly, the one or more backplane switches 134 are communicatively coupled to the wires or pins of the EEPROMs 206 and can read the identifying information and token from the EEPROMs 206 and authenticates the network adapter base 106. Having a pair of redundant EEPROMs 206 makes the system more fault tolerant such that if one of the EEPROMs 206 fails, the backplane switch 134 can still read identifying information from the remaining EEPROM 206 and authenticate the network adapter base 106. Once the network adapter base 106 has been authenticated, the I/O system 100 may operate with the network adapter base 106 as planned. However, if the network adapter base 106 is not authenticated, the I/O system 100 may refuse to operate with the network adapter base 106, a warning may be displayed, certain individuals or parties (e.g., managers, supervisors, compliance officers, manufacturers, distributors, etc.) may be notified that an authorized piece of equipment was installed, the I/O system 100 may be disabled for a period of time, and so forth.

As shown in FIG. 4, the terminal blocks 124 may also be equipped with EEPROMs 206. Because the terminal blocks 124 are not directly connected to the backplane switch 134, and thus the backplane switch 134 is not directly communicatively coupled to the EEPROMs 206 of the terminal blocks 124 when the network adapter 102 is installed, the network adapter component 108 may act as an intermediate component and read identifying information and/or token from the EEPROMs 206, which may then pass the identifying information and/or token to the backplane switch 134 for authentication. As with the authentication process for the network adapter base 106 described above, if the terminal blocks 124 are authenticated, the I/O system 100 may operate with the terminal blocks 124 as planned. However, if the terminal blocks 124 are not authenticated, the I/O system 100 may refuse to operate with the terminal blocks 124, a warning may be displayed, certain individuals or parties (e.g., managers, supervisors, compliance officers, manufacturers, distributors, etc.) may be notified that an authorized piece of equipment was installed, the I/O system 100 may be fully or partially disabled for a period of time, and so forth.

In the present embodiment, identifying information and token stored on the EEPROMs 206 may be placed on the EEPROMs 206 by the manufacturer of the respective devices before the devices are shipped. However, embodiments are also envisaged in which identifying information and/or token is stored on the EEPROMs 206 by a distributor, a retailer, a service provider, a customer, or a combination thereof.

Figure 5:
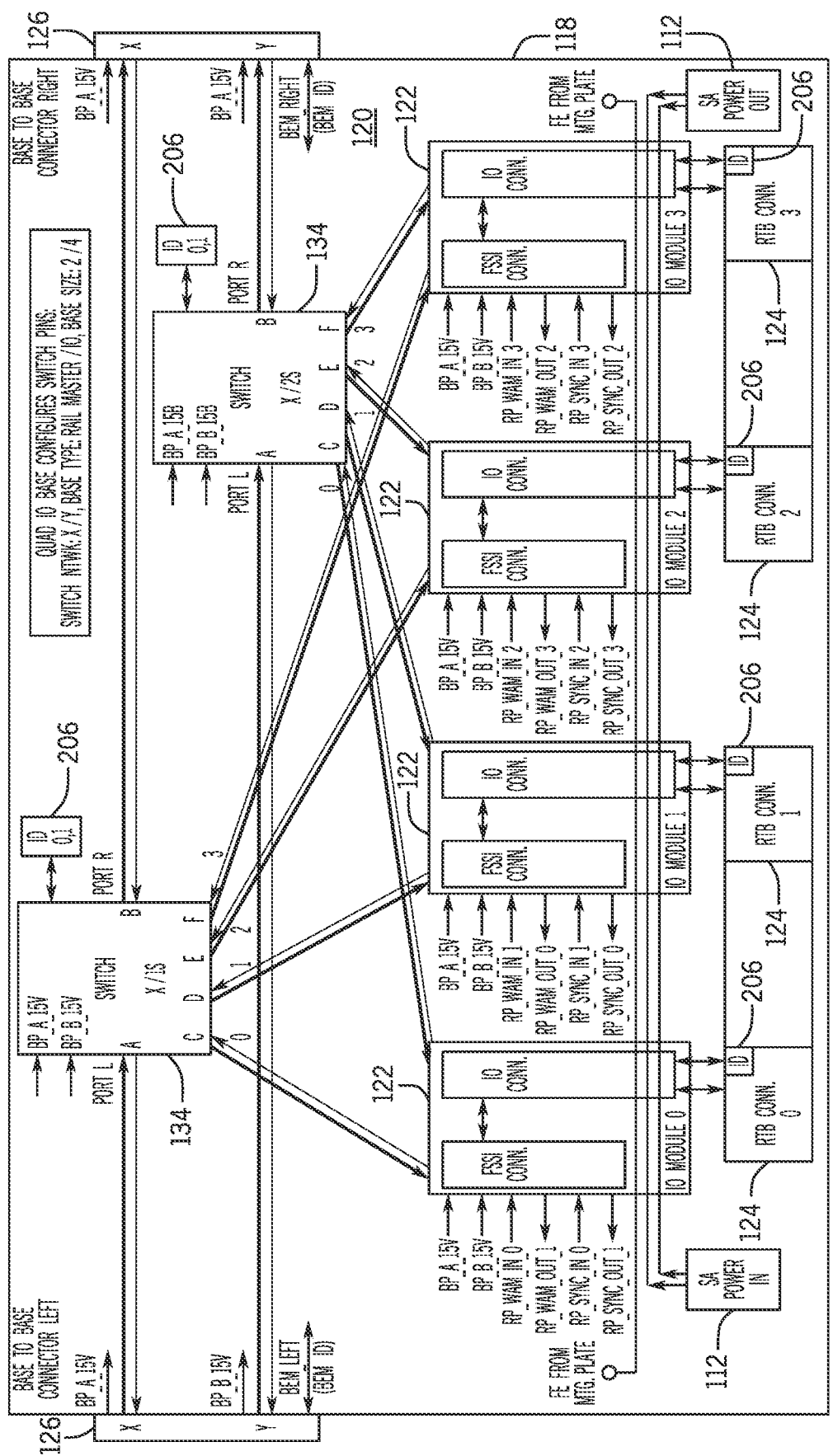
FIG. 5 is a schematic view of an I/O bank utilizing a "Quad I/O Base" I/O base, in accordance with embodiments presented herein.

FIG. 5 is a schematic view of an I/O bank 118 utilizing a "Quad I/O Base" I/O base 120. As shown, the I/O base 120 includes a pair of redundant EEPROMs 206 (e.g., EEPROM 0 and EEPROM 1), which in FIG. 5 are represented by a single box 206 that includes a "0", representing EEPROM 0, and a "1" representing EEPROM 1. The EEPROMs 206 are communicatively coupled to the backplane switch 134. As previously described, the EEPROMs 206 may be single pin or single wire EEPROMs 206 such that all data stored on the EEPROMs 206 can be read by the backplane switch 134 via a single wire or pin. The EEPROMs 206 may store identification data such as, for example, vendor ID, device type, product code, revision, serial number, product name, catalog number, manufacture date, warranty number, and so forth. The data stored on the EEPROMs 206 may or may not be encrypted. When the I/O base 120 outfitted with the pair of redundant EEPROMs 206 is installed on the rail, the I/O base 120 is communicatively coupled to the one or more backplane switches 134, such that the one or more backplane switches 134 are communicatively coupled to the wires or pins of the EEPROMs 206. Accordingly, the backplane switch 134 reads the identifying information and/or token from the EEPROMs 206 and authenticates the I/O base 120. As described above, if one of the EEPROMs 206 fails, the backplane switch 134 can still read identifying information from the remaining EEPROM 206 and authenticate the I/O base 120. Once the I/O base 120 has been authenticated, the I/O system 100 may operate with the network I/O base 120 as planned. However, if the I/O base 120 is not authenticated, the I/O system 100 may refuse to operate with the I/O base 120, a warning may be displayed, certain individuals or parties may be notified that an authorized piece of equipment was installed, the I/O system 100 may be fully or partially disabled for a period of time, and so forth.

As shown in FIG. 5, the terminal blocks 124 may also be equipped with EEPROMs 206. Because the terminal blocks 124 are not connected to the backplane switch 134, the backplane switch 134 is not communicatively coupled to the EEPROMs 206 of the terminal blocks 124 when the I/O bank 118 is installed. Accordingly, the I/O component 122 may act as an intermediate component and read identifying information and/or token from the EEPROMs 206, which may then pass the identifying information and/or token for authentication. For example, the identifying information may be passed to the backplane switch 134, the network adapter 102, a software application, a computing device, or some combination thereof for authentication. As with the authentication processes described above, if the terminal blocks 124 are authenticated, the I/O system 100 may operate with the terminal blocks 124 as planned. However, if the terminal blocks 124 are not authenticated, the I/O system 100 may refuse to operate with the terminal blocks 124, a warning may be displayed, certain individuals or parties (e.g., managers, supervisors, compliance officers, manufacturers, distributors, etc.) may be notified that an authorized piece of equipment was installed, the I/O system 100 may be fully or partially disabled for a period of time, and so forth.

Figure 6:
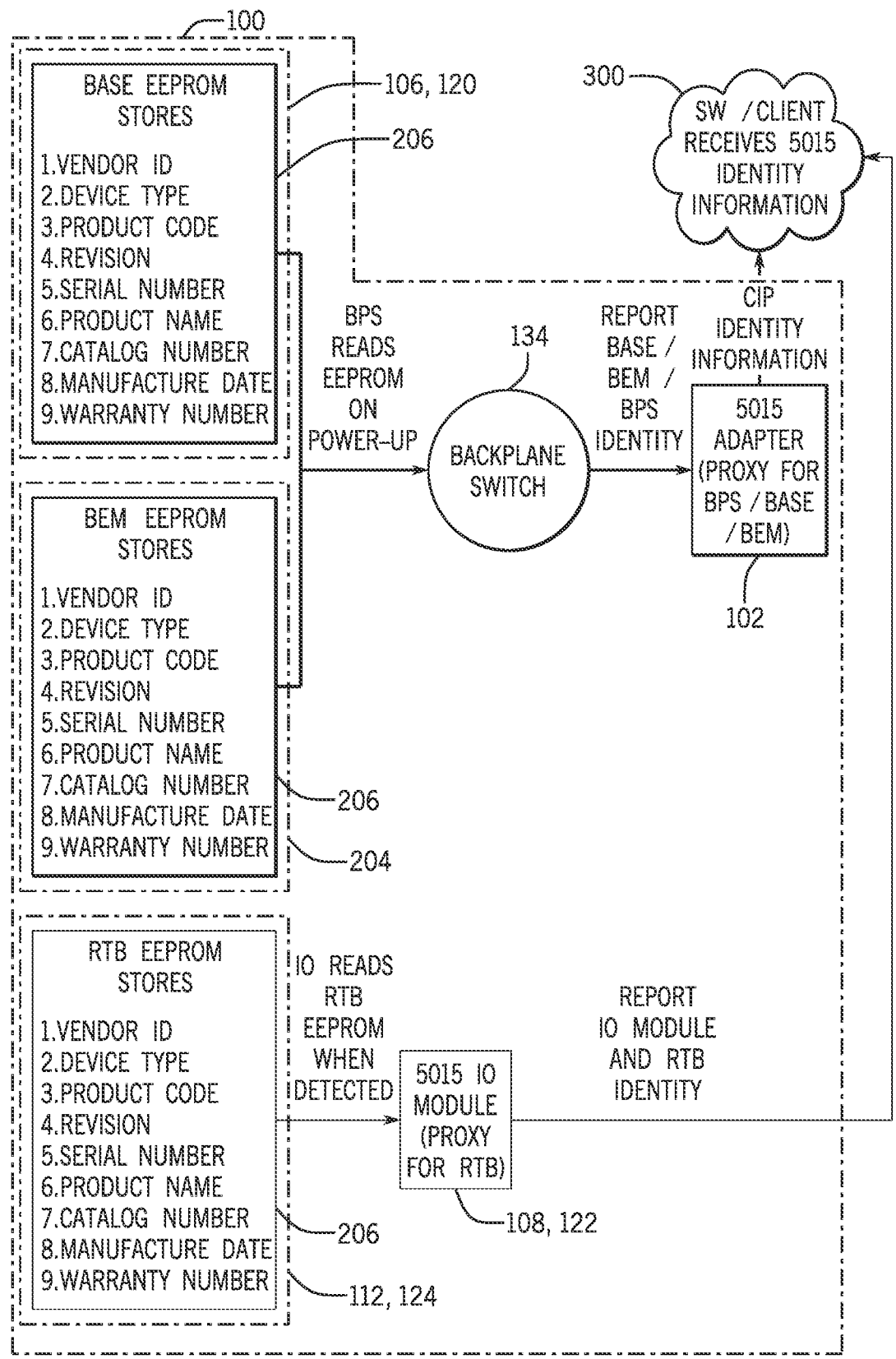
FIG. 6 is a flow chart for authenticating industrial automation components without firmware, microprocessors, or microcontrollers coupled to the I/O system of FIGS. 2 and 3, in accordance with embodiments presented herein.

FIG. 6 is a flow chart for authenticating industrial automation components without firmware, microprocessors, or microcontrollers coupled to an I/O system 100. As previously described, the network adapter base 106, the I/O base 120, the base expansion component 204, and/or the removable terminal blocks 124 may each be equipped with one or more EEPROMS 206 that store identifying information. In some embodiments, an encrypted token or secret character string is stored on the EEPROMS along with the identifying information and used to validate the identifying information stored on the EEPROMS. For example, the EEPROMs 206 may store identification data including, for example, vendor ID, device type, product code, revision, serial number, product name, catalog number, manufacture date, warranty number, and so forth. In some embodiments, the identifying information stored on the EEPROMS 206 may be encrypted, whereas in other embodiments, the identifying information stored on the EEPROMS 206 may not be encrypted.

Because the network adapter base 106, the I/O base 120, and the base expansion component 204 are communicatively coupled to the backplane switch 134, the backplane switch 134 may read the identifying information and/or token from the EEPROMS 206 of the network adapter base 106, the I/O base 120, and the base expansion component 204. The backplane switch 134 relays the identities of the network adapter base 106, the I/O base 120, and/or the base expansion component 204, as well as the identity of the backplane switch 134 to the network adapter 102, which passes the identifying information and/or token to a software application and/or a client device 300 via a wired network connection, a wireless network connection, and/or the internet. The software application and/or a client device 300 may be located local to the industrial automation system (e.g., a human-machine interface or HMI of the industrial automation system, or a nearby computing device that is in communication with the industrial automation system), or may be disposed remote from the industrial automation system (e.g., in a datacenter, at a facility run by a manufacturer, distributor, retailer, service provider, etc.). The software application and/or client device 300 either confirms the identifying information and authenticates the network adapter base 106, the I/O base 120, and the base expansion component 204 and authenticates all of the devices, or determines that one or more of the network adapter base 106, the I/O base 120, and the base expansion component 204 cannot be authenticated. The software application and/or client device 300 relays the authentication status of each component back to the network adapter 102 and the backplane switch 134.

Because the removable terminal blocks 124 are not communicatively coupled to the backplane switch 134, network adapter component 108 and/or the I/O component 122 reads the identifying information and/or token from the EEPROMS 206 of the removable terminal blocks 124 and relays the identities of the removable terminal blocks 124, as well as the identity of network adapter component 108 and/or the I/O component 122 directly to the software application and/or a client device 300 via a wired network connection, a wireless network connection, and/or the internet. The software application and/or client device 300 either confirms the identifying information and/or token and authenticates the removable terminal blocks 124 and authenticates all of the devices, or determines that one or more of the removable terminal blocks 124 cannot be authenticated. The software application and/or client device 300 relays the authentication status of each component back to the I/O component 122.

In some embodiments, providing identities of installed components to the software application and/or client device 300 may help facilitate more effective remote inventory and/or asset management. For example, when the identities of the components of the industrial automation system are provided to the software application and/or client device 300 for authentication, the information received for the various components may be stored in a database or table. Though the present disclosure is related to industrial automation components that lack firmware, microprocessors, and/or microcontrollers, it should be understood that identifying information and/or token may be provided by industrial automation components that are equipped with firmware, microprocessors, and/or microcontrollers. Accordingly, the software may create and maintain a model of the industrial automation system and its components over time. Further, the received information may be used to compare the model of the industrial automation system to the physical industrial automation system in order to verify configurations (e.g., simplex vs. duplex configurations for I/O components and removable terminal blocks, etc.). Along these lines, the received information and/or model may be used to suggest adjustments to configurations, settings, parameters, and so forth to improve how the industrial automation system operates. For example, the information may be used to suggest updates to or automatically update SerDes parameters (e.g., pre-emphasis, amplitude, etc.) based on base type used and whether a base expansion component is being used. Similarly, such data may be used during troubleshooting when a problem arises, for developing maintenance/service schedules, assisting with setup, installation, and configuration, and so forth. For example, the data may be used to determine whether the various industrial automation components are installed correctly and, if not, suggest one or more actions that can be taken to properly install the incorrectly installed industrial automation components. Further, data may be sent to manufacturers, distributors, service providers, managers, supervisors, or other interested parties to provide a better understanding of how industrial automation components are being used, how industrial automation systems are being implemented, how industrial automation components are working, and other valuable information.

Figure 7:
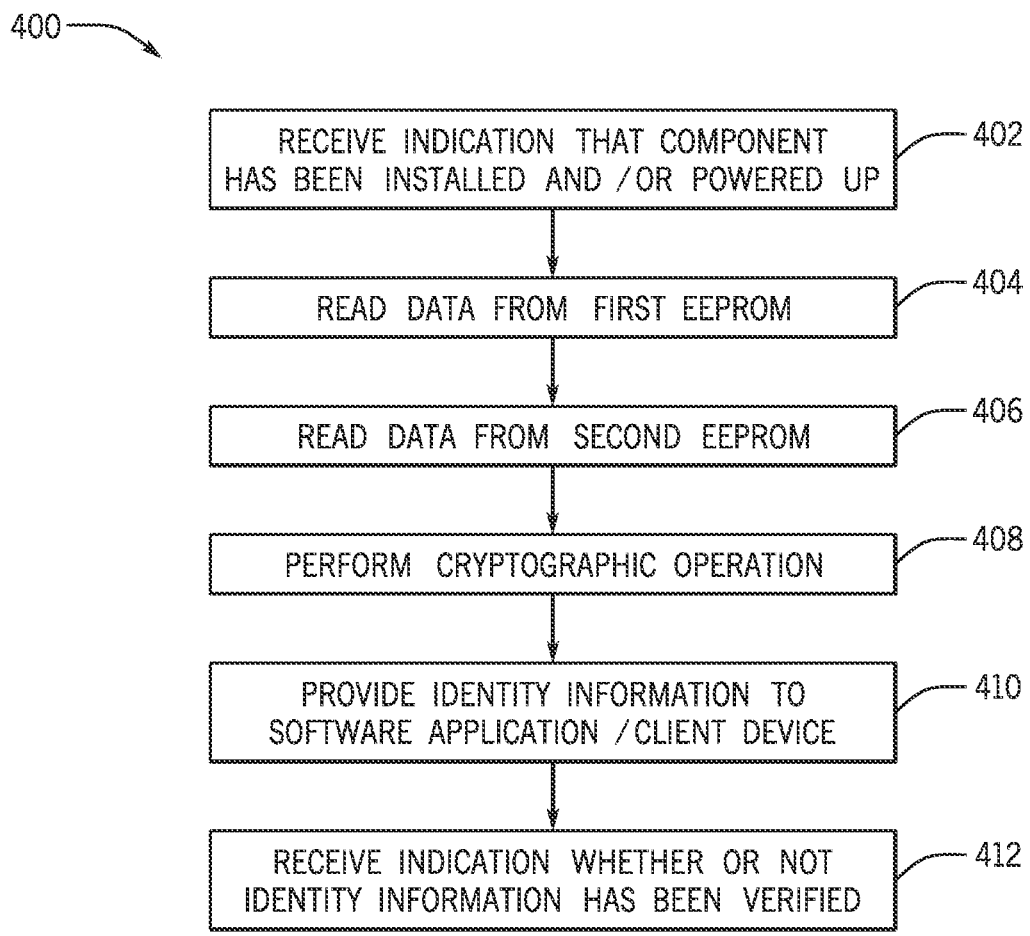
FIG. 7 is a flow chart of a process for authenticating industrial automation components, in accordance with embodiments presented herein.

FIG. 7 is a flow chart of a process 400 for authenticating industrial automation components. Specifically, the process 400 may be utilized for authenticating industrial automation components that lack firmware, microprocessors, and/or microcontrollers, and are installed in an I/O system of an industrial automation system. Such components may include, for example, network adapter bases, I/O bases, base expansion components, removable terminal blocks, and so forth. At block 402, an indication is received that the component has been installed and/or powered up. As previously discussed, the component may be equipped with one or more single-wire or single-pin EEPROMs that store identifying information (e.g., vendor ID, device type, product code, revision, serial number, product name, catalog number, manufacture date, warranty number, etc.). In some embodiments, an encrypted token or secret character string may also be stored on the EEPROMS and used to validate the identifying information. Though the instant embodiment is for components of an I/O system of an industrial automation system that lack firmware, microprocessors, and/or microcontrollers, it should be understood that similar techniques may be used for other components in other parts of an industrial automation system that lack firmware, microprocessors, and/or microcontrollers.

At block 404, identifying information and/or a token is read from the first EEPROM. As previously discussed, the EEPROMs may be single pin or single wire EEPROMs such that all data stored on the EEPROMs can be read via a single wire or pin, leaving other pins of the reading component available for connecting to other components. If the first EEPROM is part of a network adapter base, an I/O base, and/or a base expansion component, the first EEPROM may be read by a backplane switch of the I/O system. However, if the first EEPROM is part of a removable terminal block, the first EEPROM may be read by an I/O component of the I/O system.

At block 406, identifying information and/or a token is read from the second EEPROM. As with the first EEPROM, if the second EEPROM is part of a network adapter base, an I/O base, and/or a base expansion component, the second EEPROM may be read by a backplane switch of the I/O system, and if the second EEPROM is part of a removable terminal block, the second EEPROM may be read by an I/O component of the I/O system. As previously discussed, using two EEPROMs makes the system more fault tolerant such that if one of the EEPROMs fails, the identifying information can still be read from the remaining EEPROM and the component authenticated. In some embodiments, data read from multiple EEPROMs may be compared as an initial step to authenticating the component. It should be understood, however, that embodiments are envisaged in which the industrial automation component has a single EEPROM or more than two EEPROMS. For example, in some embodiments, the industrial automation component may be equipped with 3, 4, 5, 6, 7, 8, 9, 10, or more EEPROMS. Accordingly, block 406 may be removed or additional blocks added based on the number of EEPROMS used.

At block 408 a cryptographic operation may be performed. For example, if the identifying information and/or token stored on the EEPROMS is encrypted, the cryptographic operation may be used to decrypt the information read from the EEPROMS. For example the identifying information and/or tokens on the EEPROM may be encrypted and/or decrypted using asymmetric cryptography. For example, the identifying information may be encrypted using a public key. In such an embodiment, the identifying information could be decrypted using a provided private key. Further, in some embodiments, encrypted identifying information may be read from the EEPROMS, unencrypted, and then re-encrypted before being transmitted for authentication.

At block 410, the identifying information and/or tokens read from the one or more EEPROMS may be transmitted to a software application and/or client device for authentication. For example, as described with regard to FIG. 6, if the automation component is a network adapter base, an I/O base, and/or a base expansion component, the one or more EEPROMs may be read by a backplane switch of the I/O system, and then transmitted to a network adapter, which passes the identifying information and/or tokens to the software application and/or the client device via a wired network connection, a wireless network connection, and/or the internet. However, if the industrial automation component is a removable terminal block, the one or more EEPROMs may be read by an I/O component of the I/O system and passed directly to the software application and/or the client device via a wired network connection, a wireless network connection, and/or the internet. The software application and/or the client device determines whether the identifying information and/or tokens read from multiple EEPROMs matches and checks the identifying information against its own records to authenticate the industrial automation component. In some embodiments, the token or secret character string stored on the EEPROMS along with the identifying information is used to validate the identifying information stored on the EEPROMS. In some embodiments, the software application and/or the client device may check to determine whether the provided identifying information and/or token matches known information for a given category of products. That is, if the identifying information is plausible and there is nothing suspicious about the identifying information (e.g., mismatched configurations, serial numbers, etc.), the industrial automation component is authenticated. However, in other embodiments, the software application and/or the client device may tie the identifying information to a particular product or instantiation of a product before authenticating the industrial automation component. In further embodiments, the identifying information may include or be stored with a certificate to verify the authenticity of the industrial automation component. Accordingly, the authentication process performed by the software application and/or the client device may be any process from a group of authentication process that cover a spectrum of degrees of rigor. In some embodiments, the process used may be selected and/or customized by the customer, the manufacturer, distributer, service provider, etc. In other embodiments, the authentication may be performed by the I/O system (e.g., via the network adapter) without transmitting the identifying information outside of the I/O system.

At block 412, the I/O system receives an indication from the software application and/or the client device indicating whether or not the industrial automation component has been authenticated. Once the component has been authenticated, the I/O system may operate with the component as planned. However, if the component is not authenticated, the I/O system may refuse to operate with the component, a warning notification may be displayed, certain individuals or parties (e.g., managers, supervisors, compliance officers, manufacturers, distributors, etc.) may be notified that an authorized piece of equipment was installed, the I/O system may be fully or partially disabled for a period of time, and so forth.

The disclosed techniques include components of an input/output (I/O) system of an industrial automation system that lack firmware, microprocessors, and microcontrollers, but have electrically erasable programmable read-only memories (EEPROMs) that store identifying information. Such components may include, for example, network adapter bases, I/O bases, base expander components, terminal blocks, as well as other industrial automation components. When such components are connected to the I/O system, or upon being powered up, existing devices of the I/O system, such as backplane switches and/or I/O components may be configured to read the identifying information from the EEPROMs to authenticate the components. In some embodiments, the identifying information stored on the EEPROMS may be encrypted, in which case reading the identifying information from the EEPROMs may involve a cryptographic operation to decrypt the identifying information. Further, in some embodiments, the identifying information may be provided to a software application or a client device to verify the identity of the components. If the components are authenticated, they may be used as normal. However, if the components are not authenticated, a warning message/notification may be generated, and or aspects of the industrial automation system may be disabled. The identifying information may also be used to build models of the industrial automation system to suggest modifications to settings, provide installation and/or setup instructions, provide troubleshooting guidance, confirm configurations, etc.

Further, the identifying information may be used for remote inventory and/or asset management.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An input/output (I/O) system of an industrial automation system, comprising:
   a rail or plate;
   a first backplane switch coupled to the rail or plate;
   a network adapter base coupled to the first backplane switch, wherein the network adapter base comprises a first pair of electrically erasable programmable read-only memories (EEPROMs), wherein each EEPROM of the first pair of EEPROMs stores first data identifying the network adapter base, wherein the first backplane switch is configured to read the first data from at least one EEPROM of the first pair of EEPROMs to authenticate the network adapter base;
   a second backplane switch coupled to the rail, wherein the second backplane switch is disposed adjacent to the first backplane switch; and
   an I/O bank, comprising:
      an I/O base coupled to the second backplane switch, wherein the I/O base comprises a second pair of EEPROMs, wherein each EEPROM of the second pair of EEPROMs stores second data identifying the I/O base, wherein the second backplane switch is configured to read the second data from at least one EEPROM of the second pair of EEPROMs to authenticate the I/O base;
      an I/O component coupled to the I/O base and configured to perform an industrial automation input/output function associated with a component of the industrial automation system; and
      a terminal block coupled to the I/O base and configured to communicatively couple to the component of the industrial automation system, wherein the terminal block comprises a third pair of EEPROMS, wherein each EEPROM of the third pair of EEPROMs stores third data identifying the terminal block, wherein the I/O component is configured to read the third data from at least one EEPROM of the third pair of EEPROMs to authenticate the terminal block.

2. The I/O system of claim 1, comprising:
   a third backplane switch coupled to the rail, wherein the third backplane switch is disposed adjacent to the second backplane switch; and
   a second I/O bank, comprising:
      a second I/O base coupled to the third backplane switch, wherein the second I/O base lacks a processor and a microcontroller, and does not run firmware, wherein the second I/O base comprises a fourth pair of EEPROMs, wherein each EEPROM of the fourth pair of EEPROMs stores fourth data identifying the second I/O base, wherein the third backplane switch is configured to read the fourth data from at least one EEPROM of the fourth pair of EEPROMs to authenticate the second I/O base;
      a second I/O component coupled to the second I/O base and configured to perform second industrial automation input/output function associated with a second component of the industrial automation system; and
      a second terminal block coupled to the second I/O base and configured to communicatively couple to the second component of the industrial automation system, wherein the second terminal block lacks a processor and a microcontroller, and does not run firmware, wherein the second terminal block comprises a fifth pair of EEPROMs, wherein each EEPROM of the fifth pair of EEPROMs stores fifth data identifying the second terminal block, wherein the second I/O component is configured to read the fifth data from at least one EEPROM of the fifth pair of EEPROMs to authenticate the second terminal block.

3. The I/O system of claim 2, wherein the network adapter base comprises a sixth pair of EEPROMs, wherein each EEPROM of the sixth pair of EEPROMs stores the first data identifying the network adapter base, wherein the second backplane switch is configured to read the first data from at least one EPPROM of the sixth pair of EEPROMs to authenticate the network adapter base.

4. The I/O system of claim 3, wherein the I/O base comprises a seventh pair of EEPROMs, wherein each EEPROM of the seventh pair of EEPROMs stores the second data identifying the I/O base, wherein the second backplane switch is configured to read the second data from at least one EEPROM of the seventh pair of EEPROMS to authenticate the I/O base.

5. The I/O system of claim 4, comprising:
   a fourth backplane switch coupled to the rail, wherein the fourth backplane switch is disposed adjacent to the third backplane switch; and
   a base expander component coupled to the fourth backplane switch and configured to receive an additional I/O bank, wherein the base expander component lacks a processor and a microcontroller, and does not run firmware, wherein the base expander comprises an eighth pair of EEPROMs, wherein each EEPROM of the eighth pair of EEPROMS stores eighth data identifying the base expander component, wherein the fourth backplane switch is configured to read the eighth data from at least one EEPROM of the eighth pair of EEPROMs to authenticate the base expander component.

6. The I/O system of claim 1, wherein the network adapter base is part of a rail master base, and wherein the I/O bank comprises a Quad I/O Base.

7. The I/O system of claim 1, wherein the first backplane switch is configured to compare the first data read from each EEPROM of the first pair of EEPROMs to authenticate the network adapter base, wherein the second backplane switch is configured to compare the second data read from each EEPROM of the second pair of EEPROMs to authenticate the I/O base, and wherein the I/O component is configured to compare the third data read from each EEPROM of the third pair of EEPROMs to authenticate the terminal block.

8. The I/O system of claim 1, wherein the first data stored in each EEPROM of the first pair of EEPROMs is encrypted and the first backplane switch is configured to perform a cryptographic operation to decrypt the first data, wherein the second data stored in each EEPROM of the second pair of EEPROMs is encrypted and the second backplane is configured to perform a cryptographic operation to decrypt the second data, and wherein the third data stored in each EEPROM of the third pair of EEPROMs is encrypted and the I/O component is configured to perform a cryptographic operation to decrypt the third data.

9. The I/O system of claim 1, wherein the network adapter base, I/O base, and terminal block each lack a processor and a microcontroller, and do not run firmware.

* * * * *